United States Patent [19]
Jeffrey

[11] 4,265,689
[45] May 5, 1981

[54] METHODS OF JOINING GLASS OBJECTS

[75] Inventor: Cyril Jeffrey, Beaconsfield, England

[73] Assignee: Plessey Handel und Investments AG, Zug, Switzerland

[21] Appl. No.: 29,880

[22] Filed: Apr. 13, 1979

[30] Foreign Application Priority Data

Apr. 15, 1978 [GB] United Kingdom ............... 14870/78

[51] Int. Cl.³ .................... B32B 31/16; C03B 23/20; C03B 37/10; G02B 5/14
[52] U.S. Cl. .................... 156/73.2; 65/4 A; 65/4 R; 65/36; 65/152; 156/73.1; 156/276; 156/304.1; 156/304.2; 156/304.6; 350/96.2; 350/96.21
[58] Field of Search .................. 65/4 R, 36, 152, 4 A; 156/73.1, 73.2, 304, 276; 228/110; 350/96.2, 96.21

[56] References Cited

U.S. PATENT DOCUMENTS

| | | | |
|---|---|---|---|
| 2,205,582 | 6/1940 | Steimel | 65/40 |
| 3,960,531 | 6/1976 | Kohanzadeh et al. | 65/4 B |
| 4,118,618 | 10/1978 | Gauthier et al. | 350/96.2 X |

OTHER PUBLICATIONS

British Standard 499:Part 1:1965, "Welding Terms and Symbols", Definition 2601.

*Primary Examiner*—John T. Goolkasian
*Assistant Examiner*—Robert A. Dawson
*Attorney, Agent, or Firm*—Fleit & Jacobson

[57] ABSTRACT

Glass fibres to be joined are accurately positioned in axial alignment, pressure is applied to keep the end faces of the fibres in contact with each other and ultrasonic vibration of the two ends is used to generate heat to weld together the fibres. Also glass frit is used to weld into a precision probe by ultrasonic vibration of the glass frit causing it to melt.

5 Claims, 4 Drawing Figures

METHODS OF JOINING GLASS OBJECTS

The present invention relates to methods of and apparatus for joining together glass objects and particularly glass objects of a sensitive nature. In particular the methods and apparatus are applicable to joining optical fibres; and glass envelopes in which highly sensitive inter-electrode screens are incorporated.

The present invention uses the principles of ultrasonic welding to join together the glass objects.

In a particular embodiment the apparatus comprises an ultrasonic generator which includes means for accurately directing ultrasonic energy and two V grooves for holding optical fibres, the V grooves being positioned so that the free ends of the optical fibres will, when in position in said V grooves and pushed towards one another touch each other, and in which said V grooves are positioned a predetermined distance apart such that on application of said ultrasonic energy to the free ends of the optical fibres the ends are free to move in a limited manner in response to said ultrasonic energy, thus causing friction between said free ends and on cessation of the ultrasonic energy, welding together of said free ends.

In a further embodiment glass objects are joined together by introducing glass frit between said glass objects and subjecting the objects to ultrasonic vibrations thus heating the objects and the glass frit and, on cessation of the ultrasonic vibrations, joining together the glass objects.

Embodiments of the present invention will now be described, by way of example with reference to the accompanying drawings, in which.

Figure 1:
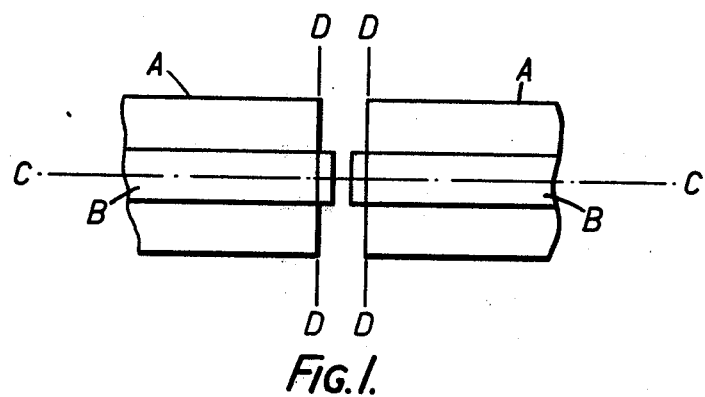
FIG. 1 illustrates a method of joining together optical fibres.

Referring now to FIG. 1 of the drawings, optical fibres B to be ultrasonically joined are aligned in a V groove precision nesting fixture A-A to eliminate axial and angular displacement of the fibre ends at the junction. The fibres are positioned in the fixture so that the fibre ends to be joined protrude a few thousandths of an inch from the end face of the V groove and are held together under a desired pressure while ultrasonic vibrations at the tuned horn tip N (see FIG. 4) force the optically flat faced fibre ends to rub against each other in a linear or rotational movement at a high frequency and at a minute amplitude. The highly localised frictional heating at the interface melts the fibre in the immediate vicinity, and flows throughout the joint area, because of the applied pressure.

This method of optical fibre joining is envisaged in the process of fibre manufacture and in field service.

Figure 2:
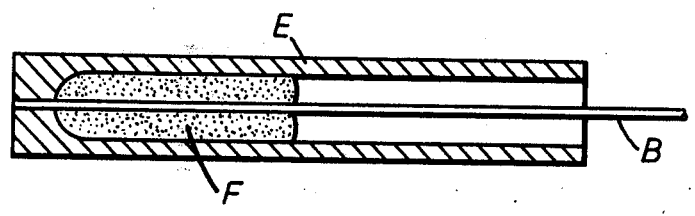
FIG. 2 shows an optical fibre being secured in a precision probe by the use of glass frit and ultrasonic energy.

Referring now to FIG. 2, the optically flat face of an optical fibre B is positioned in the precision probe E so that the fibre end is flush with the end face of the probe. The fibre B is suitably aligned in a nesting fixture P to eliminate axial and angular displacement. Glass frit F of a type to avoid a coefficient of expansion mis-match is packed and slightly compressed between the inside wall of the precision probe and the optical fibre positioned in the probe. The nesting fixture P is held under the desired pressure while ultrasonic vibration at the tuned horn tip N forces the glass frit particles to rub together at high frequency and at a minute amplitude. The localised frictional heating melts the glass frit under pressure and flows throughout the joint area.

The precision probe assembly forms part of a demountable connector. The connector is used to ensure alignment of two opposed fibres each secured in a precision probe.

Figure 3:
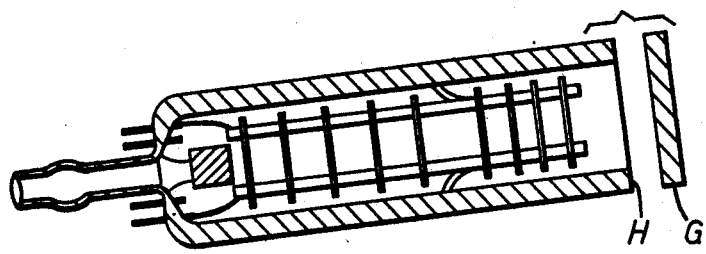
FIG. 3 shows a typical electron-optic structure mounted within a glass tube suitable for ultrasonic welding and FIG. 4 shows an ultrasonic assembly system suitable for fabricating the above articles.

Referring now to FIG. 3, the fabrication of glass envelopes by means of ultrasonic vibration is aimed at sophisticated types of electron optic devices where highly sensitive inter-electrode screens or films are incorporated within the electrode build structure, and whereby conventional gas/air torch or other methods of sealing the envelope could destroy or deteriorate the sensitive film or screen.

The parts to be assembled are held in a jig to support the parts in alignment while the ultrasonic vibrations at the tuned horn tip N (see FIG. 4) force the optically flat surface of a face plate G (up to two inches diameter) and the envelope end H to rub against each other at a high frequency and at the desired amplitude. The highly localised frictional heating under pressure melts the glass at the joint line and flows locally throughout the join.

Figure 4:
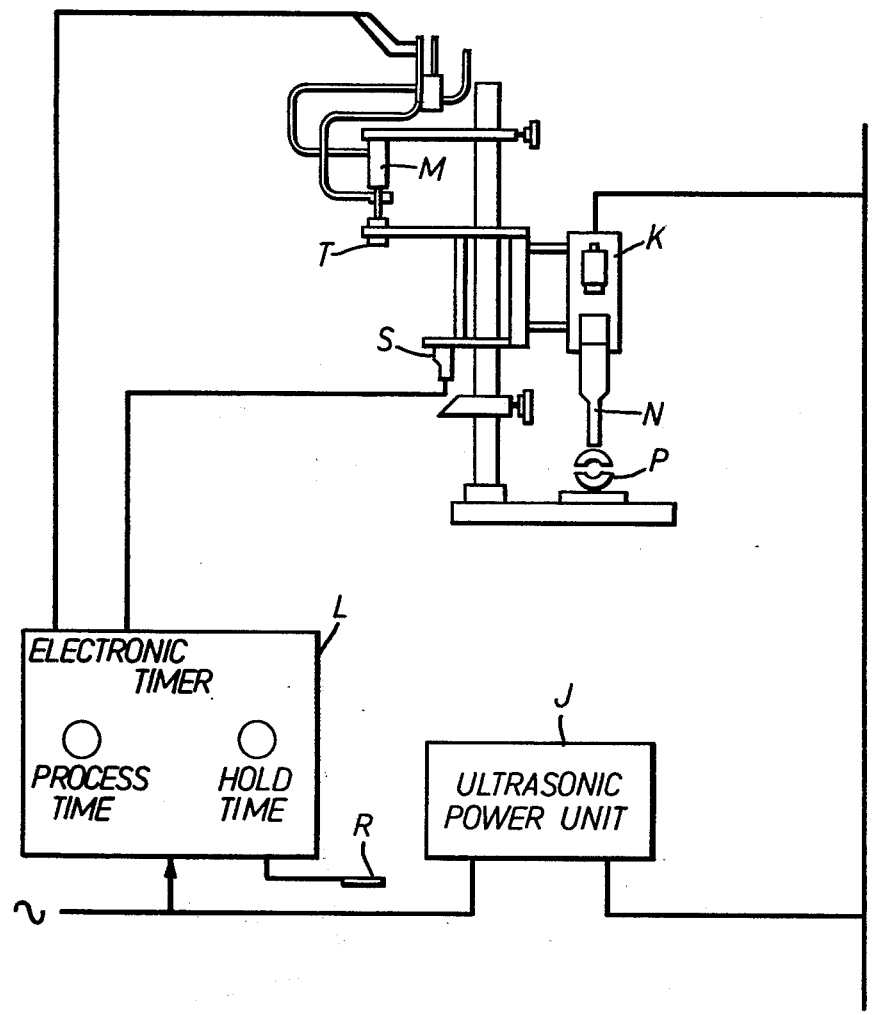

A schematic illustration of the essentials of an ultrasonic assembly system are shown in FIG. 4. The system consists of five basic units:

(1) A generator J which converts electrical energy from the mains supply to electrical energy at an ultrasonic frequency of 20 KHz, (2) A transducer unit K (or sonic converter) converts the electrical output of the generator into mechanical vibrations.

(3) A cycle timer L controls the process and hold times, (4) An air pressure regulator M to adjust the pressure of air supplied to a pneumatic actuator T and hence to control the force with which the tuned horn N is applied to the work, (5) A horn N to amplify and focus the mechanical energy produced by the transducer and impart this to the workpiece in such a way that energy utilisation is optimum.

The parts to be assembled are held in a nesting fixture P to maintain alignment and provide localised restraint. The process is initiated by a foot or hand operated switch R. The transducer unit K is attached to a precision slide mechanism and is moved vertically by the pneumatic actuator T to bring the horn into contact with the work piece with a force which is controllable from 5 to 400 lbs. A microswitch S triggers a burst of electrical energy from the power supply to the transducer at the instant the horn makes contact with the work. The electronic timer L controls the duration of this 'burst' and also subsequent 'hold' time during which the parts are held together under pressure to suit the particular application.

A range of 0.1 to 6 seconds covers most practical requirements.

The force/amplitude ratio is a function of the horn shape and effects the amplitude of movement at the work tip. The tip of the horn vibrates between limits separated by only a few thousandths of an inch and for each cycle of electrical energy supplied to the transducer, the horn tip may be visualised as making one downward and one upward movement of equal amplitude (could possibly be rotational movement). The sum of these two movements is the total excursion of the horn tip per cycle.

A peak to peak amplitude of 0.005 inch but in the 20,000 cycles of vibration occuring per second the horn tip will execute movements which add up to a total of 200 inches. It is this degree of vibration when applied to the workpiece which cause the surface layers to melt and fuse.

As a general rule, materials having a high modulus of elasticity also possess low internal losses for ultrasonic vibration, and therefore, allow maximum transmission of energy to the joint. Thus rigid materials fuse more readily than flexible ones, so that in general terms, glass filling improves the fusing or welding characteristics, while rubber loading reduces ease of fusing or welding. The addition of glass fibres will improve the accoustic properties of any material relative to the percentage used.

What is claimed is:

1. A method of joining glass objects comprising arranging said glass objects in abutting relationship, applying pressure to said glass objects, to urge them together and subjecting said glass objects to ultrasonic vibrations such that the abutting portions of said glass objects are heated by friction therebetween to the melting point of the glass whereby said glass objects are fused together on the cessation of said ultrasonic vibrations.

2. A method as claimed in claim 1 wherein glass frit is introduced between said glass objects prior to subjecting said glass objects to said ultrasonic vibrations.

3. A method as claimed in claim 1 or claim 2 wherein said glass objects comprise two optical fibres arranged in end-to-end abutting relationship.

4. A method as claimed in claim 3 wherein a predetermined length of the end of each said optical fibre is permitted a degree of movement in a radial direction.

5. A method as claimed in claims 1 or 2 wherein said glass objects comprise a glass envelope and a glass plate, said glass plate being operable to seal said glass envelope.

* * * * *